Oct. 22, 1963
H. C. MAY
3,107,681
DOUBLE CHECK VALVE
Filed March 27, 1962
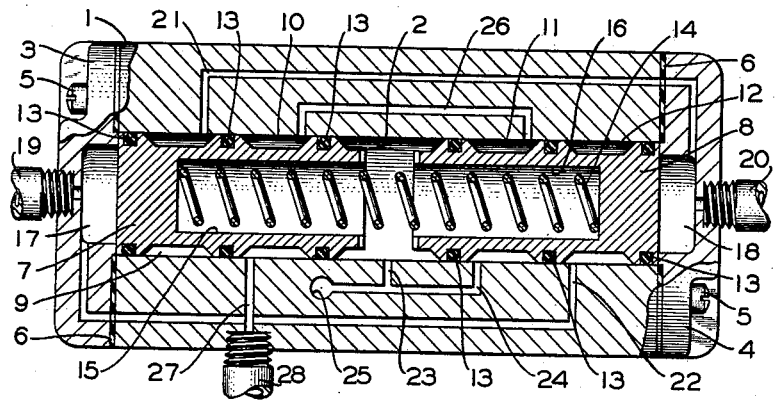
INVENTOR.
Harry C. May
BY
*A. A. Steinmiller*
Attorney United States Patent Office 3,107,681
Patented Oct. 22, 1963

3,107,681
DOUBLE CHECK VALVE
Harry C. May, East McKeesport, Pa., assignor to Westinghouse Air Brake Company, Wilmerding, Pa., a corporation of Pennsylvania
Filed Mar. 27, 1962, Ser. No. 182,898
3 Claims. (Cl. 137—112)

This invention relates to double check valves of the reverse type for selectively controlling the flow of fluid under pressure between either one of two supply pipes and a delivery pipe according to which of the fluid pressures in said two pipes is the lower, and more particularly, to such a valve operatively responsive to low operating pressures with no stalling in mid-position during crossover and with no crossover communication between either of said supply pipes.

Double check valves are of two types, namely (1) the regular type where a common delivery pipe is connected selectively to one of two supply pipes, the selected supply pipe being that with the higher fluid pressure therein; and (2) the reverse type wherein the common delivery pipe is connected selectively to that one of the two supply pipes having the lower fluid pressure therein.

In modern types of railway braking apparatus there has been an increased need for the reverse type of double check valve, and in most cases the reverse type of double check valve presently used has not been satisfactory due to impositive operation at low operating pressures.

According to the present invention, there is provided a new and improved double check valve of the reverse type which properly and positively positions the operating valve portions therein, responsively to low operating fluid pressures and slow build-up thereof in either of the usual supply or branch pipes controlling said double check valve. This improved double check valve also provides for automatic venting of the delivery port thereof at very low fluid pressure, and prevention of crossover communication between either of the supply ports thereof.

In the accompanying drawing, the single FIGURE shows a sectionalized view of the double check valve as connected to portions of two supply or branch pipes and a single delivery pipe.

*Description*

As shown in the drawing, the double check valve comprises a valve body 1 having a longitudinal concentric bore 2 therein with the ends of said bore being closed by end caps 3 and 4 suitably attached to the body 1 as by bolts 5 with circumferential sealing gaskets 6 placed between said end caps and said body. Slidably positioned within said bore 2 are two similar spool valves 7 and 8 each having on the outer surface thereof two encircling grooves 9, 10 and 11, 12, respectively, and formed between three lands having grooves containing O-ring seals 13. A spring 14 is positioned between said spool valves with the opposite ends of said spring extending into bores 15 and 16 in one end of each valve respectively, in a manner to bias both valves outwardly in said bore 2 against opposite end caps 3 and 4. Supply chambers 17 and 18 are formed in each end cap 3 and 4, respectively, with the face of spool valve 7 forming one side of the supply chamber 17 and the face of spool valve 8 forming one side of chamber 18. A supply pipe 19 is suitably connected to a port in cap 3 via which fluid under pressure is supplied to the chamber 17. A supply pipe 20 is similarly connected to a port in cap 4 via which fluid under pressure is supplied to chamber 18.

Within the valve body 1 and end caps are formed a plurality of passages including a supply passage 21 connecting supply chamber 18 to the bore 2 at a location normally open to groove 9 of the spool valve 7, a supply passage 22 connecting supply chamber 17 to the bore 2 at a location normally open to groove 12 of the spool valve 8.

Also within the valve body is a venting passage 23 and a branch passage 24 opening into the bore 2, both of said passages being connected to atmosphere at a venting port 25.

A connecting passage 26 in the valve body 1 normally connects the groove 10 of spool valve 7 and the groove 11 of spool valve 8.

The delivery passage 27 connects the bore 2 to a delivery pipe 28.

*Operation*

With no fluid pressure being supplied by the supply pipes 19 and 20, the spool valves of the double check valve device will assume their respective positions shown in the drawing where both the supply passages 21 and 22 are blanked off at the grooves 9 and 12 of the respective spool valves 7 and 8, and the delivery pipe 28 is connected to atmosphere by way of passage 27, groove 10 of valve 7, passage 26, groove 11 of valve 8, passage 24 and vent port 25.

In operation, both supply pipes 19 and 20 are connected to suitable sources of supply with either one being supplied with fluid under a higher pressure than the other to operate the double check valve in a manner hereinafter described such that the source of supply with the lower pressure is in communication with the delivery pipe 28 and the source of supply with the higher pressure being blanked off.

For purposes of description, assume that the fluid supplied to supply pipe 19 is of lower pressure than that supplied to the supply pipe 20. The fluid pressure build-up in the chamber 18 due to the predominant pressure therein, will cause the spool valve 8 to move to the left in the bore 2 against the forces of spring 14 until the open end of said spool valve 8 engages the open end of the spool valve 7 to overcome the opposing lower pressure acting on the spool valve 7 to thereby maintain spool valve 7 in its normal position with the face end thereof engaging the end cap 3.

With the spool valve 7 maintained in its normal position as just explained, the higher fluid pressure supplied to chamber 18 and passage 21 is blanked off at the groove 9. With the spool valve 8 in its left-most position as just explained, the lower pressure supply of fluid from pipe 19 flows from the chamber 17 via supply passage 22, groove 12 of spool valve 8, connecting passage 26 to the groove 10 of spool valve 7 and delivery passage 27 to the delivery pipe 28. Thus, with the higher fluid pressure supplied from pipe 20, only the lower pressure fluid from pipe 19 will be supplied to the delivery pipe 28.

Should operational requirements of equipment with which said double check valve device is included be altered such that the supply pipe 19 be supplied with fluid under pressure from the high pressure source, and supply pipe 20 be supplied with fluid under pressure from the low pressure source, the higher pressure in the chamber 17 acting on the face of the spool valve 7 will overcome the forces of the spring 14 and the low pressure acting on the face of spool valve 8 to cause the spool valve 7 to move to the right in the bore 2 to its right-most position engaging the open end of spool valve 8 and maintaining spool valve 8 in its normal position with the face end thereof against the end cap 4.

With the spool valve 8 maintained in its normal position as just explained, the higher pressure supply of fluid from the supply pipe 19 and passage 22 is blanked off at the groove 12. With the spool valve 7 in its right-most position, the lower pressure supply of fluid from pipe 20 flows from chamber 18 via supply passage 21, groove 9 of spool valve 7, and delivery passage 27 to the delivery pipe 28. Thus, with higher pressure fluid supplied from pipe 19, only the lower pressure fluid from pipe 20 will be supplied to the delivery pipe 28.

It should be noted that the force of spring 14 is predetermined such that the spool valves 7 and 8 are operative at low pressures and responsive to slight fluid pressure differences from one position to the other as required. With the spool valve arrangement as such with separate passages for each supply pipe, there can be no crossover communication to the delivery pipe, that is, a supply of fluid under pressure to the delivery pipe from both supply pipes during a change of position of the spool valves as occurs in double check valves of previously known types. The present double check valve, therefore, provides a positive operation responsively to low operating pressures with no stalling of the spool valves in mid-position.

Having now described the invention, what I claim as new and desire to secure by Letters Patent, is:

1. A double check valve device of the reverse type in which the lower of two supply fluid pressures is selectively connected to a delivery line, said valve device comprising:
    (a) a valve body having a through bore therein,
    (b) end caps sealingly secured to said body to close the ends of said through bore, each end cap having a supply chamber therein communicating with the corresponding end of said bore and to which fluid pressure from different sources may be respectively supplied,
    (c) two spool valve elements slidably operable in sealed tandem relation in said bore and subject at the outer end thereof to the fluid pressure in a corresponding one of said supply chambers, each of said valve elements having a plurality of sealingly separated annular grooves in the outer surface thereof,
    (d) spring means interposed in a chamber intervening between the adjacent inner ends of said spool valve elements and biasing said valve elements respectively in opposite directions to normal positions,
    (e) separate supply passageways in each of said end caps extending into said body, each respectively connecting a corresponding one of said supply chambers to the said through bore adjacent the end of said through bore opposite to said one of said supply chambers,
    (f) an exhaust passageway in said body opening to said bore via which said chamber intervening between said spool valves is constantly connected to atmosphere, and
    (g) a delivery passageway in said body opening to said through bore via which fluid under pressure may be supplied to a receiving device,
    (h) that one of the said spool valve elements subject to the higher fluid pressure being shiftable against the force of said spring means into an operating position in contact with the other of said spool valve elements which is thereby held in its normal position, said one of the spool valve elements in its operating position cutting off the communication between said delivery passageway and said exhaust passageway and establishing communication between the supply passageway from the supply chamber having the lower fluid pressure therein and the said delivery passageway.

2. A double check valve device of the reverse type in which the lower of two supply fluid pressures is selectively connected to a delivery line, said valve device comprising:
    (a) a valve body having a through bore therein,
    (b) end caps sealingly secured to said body to close the ends of said through bore, each end cap having a supply chamber therein communicating with the corresponding end of said bore and to which fluid pressure from different sources may be respectively supplied,
    (c) two spool valve elements slidably operable in sealed tandem relation in said bore and subject at the outer end thereof to the fluid pressure in a corresponding one of said supply chambers, each of said valve elements having a plurality of sealingly separated annular grooves in the outer surface thereof,
    (d) spring means interposed in a chamber intervening between the adjacent inner ends of said spool valve elements and biasing said valve elements respectively in opposite directions to normal positions,
    (e) separate supply passageways in each of said end caps extending into said body each respectively connecting a corresponding one of said supply chambers to the said through bore adjacent the end of said through bore opposite to said one of said supply chambers,
    (f) an exhaust passageway in said body opening to said bore via which said chamber intervening between said spool valves is constantly connected to atmosphere, and
    (g) a delivery pasageway in said body opening to said through bore via which fluid under pressure may be supplied to a receiving device,
    (h) both of said spool valve elements being jointly effective in their respective normal positions to establish communication via respective grooves therein between said delivery passage and said exhaust passage, and that one of said spool valve elements subject to the higher fluid pressure being shiftable against the force of said spring means into an operating position in contact with the other of said spool valve elements which is thereby held in its normal position, said one of the spool valve elements in its operating position cutting off the communication from said delivery passageway to said exhaust passageway via one of the grooves therein and establishing communication via another of said grooves therein between the supply passageway from the supply chamber having the lower fluid pressure therein and the said delivery passageway.

3. A double check valve device for selectively controlling communication between one or the other of a pair of supply ports therein and a delivery port therein, said check valve device comprising:
    (a) a valve body having a longitudinal bore therethrough,
    (b) a first cap means for closing one end of said bore and containing one of the supply ports,
    (c) second cap means for closing the other end of said bore and containing the other supply port,
    (d) a first spool valve slidably positioned within said bore to form a first supply chamber with said first cap means,
    (e) a second spool valve slidably positioned in sealed tandem relation with said first spool valve within said bore to form a second supply chamber with said second cap means,
    (f) spring means interposed in an exhaust chamber intervening between the adjacent inner ends of said spool valves in the said bore in a manner to bias said spool valves away from each other to respective normal positions,
    (g) exhaust port means connecting said exhaust chamber to atmosphere,
    (h) each of said spool valves having a plurality of circumferentially encircling grooves separated from each other by sealing means,
    (i) a delivery passageway in said body opening into said bore and connected to said delivery port and to the innermost one of said grooves of said first spool valve when said first spool valve is in its normal position,
    (j) a plurality of supply passageways in each of said end caps and said body connecting respectively said first supply chamber to said bore at the outermost groove of said second spool valve adjacent to the corresponding end of said bore, and said second supply chamber to said bore at the outermost groove of said first spool valve adjacent to the corresponding end of said bore, (k) a connecting passageway means opening to the innermost of said grooves of each of said spool valves and to said exhaust port when said spool valves are in their respective normal positions, (l) that one of said spool valves subject to the higher fluid pressure at the corresponding said supply chamber being shiftable against the force of said spring means into an operating position in contact with the other of said spool valves which is thereby maintained in its normal position, said one of said spool valves in its operating position cutting off communication between said delivery passage and said exhaust passageway at said connecting passageway means and establishing communication between the other of said supply chambers having the lower fluid pressure therein and the said delivery passage.

References Cited in the file of this patent

UNITED STATES PATENTS

| | | |
|---|---|---|
| 730,085 | Berg | June 2, 1903 |
| 2,110,702 | Farmer | Mar. 8, 1938 |
| 2,643,664 | Willett | June 30, 1953 |
| 2,678,851 | Laber | May 18, 1954 |
| 2,699,972 | Burriss | Jan. 18, 1955 |
| 2,774,369 | Di Tirro | Dec. 18, 1956 |
| 2,778,372 | Jaquith | Jan. 22, 1957 |
| 3,043,325 | Slawson | July 10, 1962 |